US006948135B1

(12) United States Patent
Ruthfield et al.

(10) Patent No.: US 6,948,135 B1
(45) Date of Patent: Sep. 20, 2005

(54) METHOD AND SYSTEMS OF PROVIDING INFORMATION TO COMPUTER USERS

(75) Inventors: Scott L. Ruthfield, Seattle, WA (US); Richard Banks, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 800 days.

(21) Appl. No.: 09/599,806

(22) Filed: Jun. 21, 2000

(51) Int. Cl.[7] .............................................. G06F 17/30
(52) U.S. Cl. ...................................... 715/854; 715/817
(58) Field of Search ................................ 715/804, 805, 715/853–855, 760, 748–749, 767, 811, 817–820, 752, 742, 712–713, 711; 345/853–855, 708–714, 81.7, 771–773, 760, 748–749, 744–747, 802–806, 811–813, 792

(56) References Cited

U.S. PATENT DOCUMENTS

| 4,514,800 | A | 4/1985 | Gruner et al. |
| 4,674,040 | A | 6/1987 | Barker et al. |
| 4,739,477 | A | 4/1988 | Barker et al. |
| 4,815,029 | A | 3/1989 | Barker et al. |
| 4,933,880 | A | 6/1990 | Borgendale et al. |
| 4,962,475 | A | 10/1990 | Hernandez et al. |
| 5,072,412 | A | 12/1991 | Henderson, Jr. et al. |
| 5,187,786 | A | 2/1993 | Densmore et al. |
| 5,191,645 | A | 3/1993 | Carlucci et al. |
| 5,204,947 | A | 4/1993 | Bernstein et al. |
| 5,206,951 | A | 4/1993 | Khoyi et al. |
| 5,237,680 | A | 8/1993 | Adams et al. |
| 5,249,275 | A | 9/1993 | Srivastava |

(Continued)

FOREIGN PATENT DOCUMENTS

| EP | 0 961 197 | 1/1999 |
| JP | 3191429 | 1/1900 |

OTHER PUBLICATIONS

U.S. Appl. No. 60/191,662, filed Jan. 1, 1900.

U.S. Appl. No. 60/203,081, Ben–Natan et al., filed Jan. 1, 1900.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

(Continued)

Primary Examiner—Steven Sax
(74) Attorney, Agent, or Firm—Lee & Hayes, PLLC

(57) ABSTRACT

Methods and systems of providing information to computer users are described. In one embodiment, a user interface is provided having a display area that permits a user to accomplish various tasks. Individual tasks can be associated with individual different functionalities which can enable the user to accomplish tasks in different user contexts, e.g. word processing-tasks, email tasks web browsing tasks and the like. The different tasks can advantageously pertain to different content types or document types. When a user is working within a particular context, they can view quick links that are associated with one or more of the different contexts without having to change their particular context. By clicking on a quick link, the user then can automatically navigate to the context associated with the quick link so that they can then accomplish context-specific tasks. Advantageously, the various functionalities or contexts can be provided by a single application program that also manages the user's navigation activities to and between the different functionalities. In various embodiments, a user can select from among a number of different algorithms that are deployable across different content types and which affect which quick links are displayed.

32 Claims, 11 Drawing Sheets

U.S. PATENT DOCUMENTS

| | | |
|---|---|---|
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,646 A | 5/1994 | Hendricks et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,377,323 A | 12/1994 | Vasudevan et al. |
| 5,381,547 A | 1/1995 | Flug et al. |
| 5,408,665 A | 4/1995 | Fitzgerald |
| 5,410,688 A | 4/1995 | Williams et al. |
| 5,434,975 A | 7/1995 | Allen |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,608,720 A | 3/1997 | Biegel et al. |
| 5,634,121 A | 5/1997 | Tracz et al. |
| 5,640,544 A | 6/1997 | Onodera et al. |
| 5,659,729 A | 8/1997 | Nielsen |
| 5,664,178 A | 9/1997 | Sinofsky |
| 5,682,536 A | 10/1997 | Atkinson et al. |
| 5,689,703 A | 11/1997 | Atkinson et al. |
| 5,706,501 A | 1/1998 | Horikiri et al. |
| 5,740,439 A | 4/1998 | Atkinson et al. |
| 5,745,683 A | 4/1998 | Lee et al. |
| 5,758,184 A | 5/1998 | Lucovsky et al. |
| 5,758,358 A | 5/1998 | Ebbo |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,784,555 A | 7/1998 | Stone |
| 5,802,304 A | 9/1998 | Stone |
| 5,806,079 A * | 9/1998 | Rivette et al. ............. 715/512 |
| 5,815,830 A | 9/1998 | Anthony |
| 5,838,906 A | 11/1998 | Doyle et al. |
| 5,842,018 A | 11/1998 | Atkinson et al. |
| 5,854,630 A | 12/1998 | Nielsen |
| 5,864,819 A | 1/1999 | De Armas et al. |
| 5,907,704 A * | 5/1999 | Gudmundson et al. ..... 345/854 |
| 5,911,776 A | 6/1999 | Guck |
| 5,922,072 A | 7/1999 | Hutchinson et al. |
| 5,940,075 A | 8/1999 | Mutschler, III et al. |
| 5,963,964 A | 10/1999 | Nielsen |
| 5,987,480 A | 11/1999 | Donohue et al. |
| 5,991,710 A * | 11/1999 | Papineni et al. ................ 704/2 |
| 6,014,135 A | 1/2000 | Fernandes |
| 6,016,520 A | 1/2000 | Facq et al. |
| 6,026,379 A | 2/2000 | Haller et al. |
| 6,026,416 A | 2/2000 | Kanerva et al. |
| 6,031,989 A | 2/2000 | Cordell |
| 6,044,205 A | 3/2000 | Reed et al. |
| 6,052,710 A | 4/2000 | Saliba et al. |
| 6,072,870 A | 6/2000 | Nguyen |
| 6,078,326 A | 6/2000 | Kilmer et al. |
| 6,078,327 A | 6/2000 | Liman et al. |
| 6,081,610 A | 6/2000 | Dwork et al. |
| 6,091,417 A * | 7/2000 | Lefkowitz .................... 345/760 |
| 6,094,657 A | 7/2000 | Hailpern et al. |
| 6,098,081 A | 8/2000 | Heidorn et al. |
| 6,108,637 A | 8/2000 | Blumenau |
| 6,108,783 A | 8/2000 | Krawczyk et al. |
| 6,122,647 A * | 9/2000 | Horowitz et al. ........... 715/513 |
| 6,151,624 A | 11/2000 | Teare et al. |
| 6,163,772 A | 12/2000 | Kramer et al. |
| 6,167,521 A | 12/2000 | Smith et al. |
| 6,195,661 B1 | 2/2001 | Filepp et al. |
| 6,199,204 B1 | 3/2001 | Donohue |
| 6,216,152 B1 | 4/2001 | Wong et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,275,227 B1 | 8/2001 | DeStefano |
| 6,275,599 B1 | 8/2001 | Adler et al. |
| 6,286,033 B1 | 9/2001 | Kishinsky et al. |
| 6,292,897 B1 | 9/2001 | Gennaro et al. |
| 6,297,819 B1 * | 10/2001 | Furst ........................ 345/854 |
| 6,308,179 B1 | 10/2001 | Petersen et al. |
| 6,311,271 B1 | 10/2001 | Gennaro et al. |
| 6,321,334 B1 | 11/2001 | Jerger et al. |
| 6,327,628 B1 | 12/2001 | Anuff et al. |
| 6,343,302 B1 * | 1/2002 | Graham .................. 715/501.1 |
| 6,345,256 B1 | 2/2002 | Milsted et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,926 B1 | 3/2002 | Parthesarathy et al. |
| 6,366,912 B1 | 4/2002 | Wallent et al. |
| 6,369,840 B1 * | 4/2002 | Barnett et al. ............. 345/853 |
| 6,374,402 B1 | 4/2002 | Schmeidler |
| 6,381,743 B1 | 4/2002 | Mutschler, III |
| 6,389,434 B1 * | 5/2002 | Rivette et al. ............. 715/512 |
| 6,393,456 B1 | 5/2002 | Ambler et al. |
| 6,396,488 B1 * | 5/2002 | Simmons et al. ........... 345/353 |
| 6,408,311 B1 | 6/2002 | Baisley et al. |
| 6,421,070 B1 * | 7/2002 | Ramos et al. ............... 345/763 |
| 6,421,656 B1 | 7/2002 | Cheng et al. |
| 6,434,563 B1 * | 8/2002 | Pasquali et al. .............. 707/10 |
| 6,434,564 B2 * | 8/2002 | Ebert ........................ 707/100 |
| 6,442,755 B1 | 8/2002 | Lemmons et al. |
| 6,446,110 B1 | 9/2002 | Lection et al. |
| 6,460,058 B2 * | 10/2002 | Koppolu et al. ............ 715/738 |
| 6,473,800 B1 | 10/2002 | Jerger et al. |
| 6,476,833 B1 * | 11/2002 | Moshfeghi .................. 345/854 |
| 6,477,544 B1 * | 11/2002 | Bolosky et al. ............ 707/200 |
| 6,493,702 B1 * | 12/2002 | Adar et al. .................... 707/3 |
| 6,502,103 B1 | 12/2002 | Frey et al. |
| 6,505,300 B2 | 1/2003 | Chan et al. |
| 6,519,617 B1 | 2/2003 | Wanderski et al. |
| RE38,070 E | 4/2003 | Spies et al. |
| 6,546,546 B1 | 4/2003 | Van Doorn |
| 6,560,640 B2 * | 5/2003 | Smethers .................... 709/219 |
| 6,578,144 B1 | 6/2003 | Gennaro et al. |
| 6,581,061 B2 * | 6/2003 | Graham ...................... 707/10 |
| 6,606,606 B2 | 8/2003 | Starr |
| 6,609,200 B2 | 8/2003 | Anderson et al. |
| 6,611,822 B1 | 8/2003 | Beams et al. |
| 6,631,357 B1 * | 10/2003 | Perkowski .................... 705/26 |
| 6,643,684 B1 | 11/2003 | Malkin et al. |
| 6,668,369 B1 | 12/2003 | Krebs et al. |
| 6,678,717 B1 * | 1/2004 | Schneider .................. 709/203 |
| 6,691,230 B1 | 2/2004 | Bardon |
| 6,697,944 B1 | 2/2004 | Jones et al. |
| 6,701,434 B1 | 3/2004 | Rohatgi |

| | | | |
|---|---|---|---|
| 6,711,679 B1 | | 3/2004 | Guski et al. |
| 6,748,385 B1 | * | 6/2004 | Rodkin et al. ............. 707/10 |
| 6,751,777 B2 | * | 6/2004 | Bates et al. ............. 715/501.1 |
| 6,772,139 B1 | * | 8/2004 | Smith, III ............. 707/3 |
| 6,774,926 B1 | * | 8/2004 | Ellis et al. ............. 348/14.01 |
| 2001/0056429 A1 | | 12/2001 | Moore |
| 2002/0026461 A1 | | 2/2002 | Kutay et al. |
| 2002/0057297 A1 | | 5/2002 | Grimes et al. |
| 2002/0174147 A1 | | 11/2002 | Wang et al. |
| 2003/0120659 A1 | | 6/2003 | Sridhar |
| 2003/0158897 A1 | | 8/2003 | Ben-Natan et al. |

OTHER PUBLICATIONS

"Netscape window" Netscape Screenshot, Oct. 2, 2002.

Jan–Henrick Haukeland: "Tsbiff—tildeslash biff—version 1.2.1" Internet Document, [Online] Jun. 1999, URL:http://web.archive.org/web/19990912001527/http://www.tildeslash.com/tsbiff/.

Noore A.; "A secure conditional access system using digital signature and encryption" 2003 Digest of Technical Papers, International Conference on Consumer Electronics Jun. 2003 pp. 220–221.

Komatsu N. et al.; "A proposal on digital watermark in document image communication and its application to realizing a signature" Electronics and Communications in Japan.

Sun Q. et al.; "A robust and secure media signature scheme for JPEG images" Proceedings of 2002 IEEE Workshop on Multimedia Signal Processing Dec. 2002 pp. 296–299.

Whitehill; "Whitehill Composer" Whitehill Technologies Inc. 2 pages.

Pacheco et al.; "Delphi 5 Developer's Guide" Sams Publishing 1999 Chapter 31 Section: Data Streaming 6 pages.

Clarke; "From small beginnings"; Knowledge Management, Nov. 2001; www.bl.uk; 2 pages.

Hwang, et al; "Micro–Firewalls for Dynamic Network Security with Distributed Intrusion Detection"; IEEE International Symposium on Network Computing and Applications; 2001; pp. 68–79.

Schmid, et al; "Protecting Data from Malicious Software"; 18th Annual Computer Security Applications Conference; 2002; pp. 199–208.

Kaiya, et al; "Specifying Runtime Environments and Functionalities of Downloadable Components Under the Sandbox Model", International Symposium on Principles of Softwre Evolution; 2000; pp. 138–142.

Prevelakis, et al; "Sandboxing Applications"; Proceedings of the FREENIX Track; 2001; pp. 119–126.

Tomimori, et al; "An Efficient and Flexible Access Control Framework for Java Programs in Mobile Terminals"; 22nd International Conference on Distributed Computing Systems Workshops; 2002; pp. 777–782.

Clark, James, Ed.; "XSL: Transformation (XSLT) Version 1.0", Nov. 16, 1999, W3C (MIT, INRIA, Keio), pp. 1–156.

Clark, James and Steve Derose, "XML Path Language (XPath) Version 1.0", Nov. 16, 1999, W3C (MIT, INRIA, Keio), pp. 1–49.

Musgrave, S., "Networking technology—impact and opportunities," Survey and Statistical Computing 1996. Proceedings of the Second ASC International Conference, Sep. 1996, pp. 369–378, London, UK.

Rapaport, L., "Get more from SharePoint," Transform Magazine, vol. 11, No. 3, Mar. 2002, pp. 13, 15.

McCright, J.S., "New Tool Kit to Link Groove with Microsoft SharePoint", eWeek, Enterprise News & Reviews, Ziff Davis Media Inc., Jul. 29, 2002, 1 page.

Provisional Application No. 60/209,713, filed Jun. 5, 2000.

Dayton, et al.; Photo Shop 5/5.5 WOW! Book, Nov. 9, 1999; Peachpit Press, pp. 8–17.

W. Brogden, "Arbortext Adapt 8 Editor Review," O'Reilly XML.COM, 'Online! Sep. 22, 1999) XP002230080, retrieved from the Internet <URL:http://www.xml.com/pub/a/1999/09/adept/AdeptRvw.htm>, retrieved on Feb. 5, 2003.

L Alschuler, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.

A. Davidow, "XML Editors: Allegations of Functionality in search of reality," INTERNET, 'Online! 1999, XP002230082, retrieved from the Internet, <URL:http://www.ivritype.com/xml/>.

Steven A. Battle, et al., "Flexible Information Presentation with XML", 1998, The Institution of Electrical Engineers, 6 pages.

Paolo Ciancarini, et al., "Managing Complex Documents Over the WWW: A Case Study for XML", IEEE Transactions on Knowledge and Data Engineering, vol. 11, No. 4, Jul./Aug. 1999, pp. 629–638.

Hirotaka Kanemoto, et al., "An Efficiently Updatable Index Scheme for Structured Documents", 1998 IEEE, pp. 991–996.

Tommie Usdin, et al., "XML: Not a Silver Bullet, But a Great Pipe Wrench", Standardview vol. 6, No. 3, Sep. 1998, pp. 125–132.

Supoj Sutanthavibul, et al., "XFIG Version 3.2 Patchlevel 2(Jul. 2, 1998) Users Manual (Edition 1.0)", Internet Document, [Online] Jul. 2, 1998 XP002229137 Retrieved from the Internet: <URL:http://www.ice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245–246.

Irene Au & Shuang Li, "Netscape Communicator's Collapsible Toolbars," CHI '98, Human Factors in Computing Systems, Conference Proceedings, Los Angeles, CA, Apr. 18–23, 1998, pp. 81–86.

* cited by examiner

Fig. 6

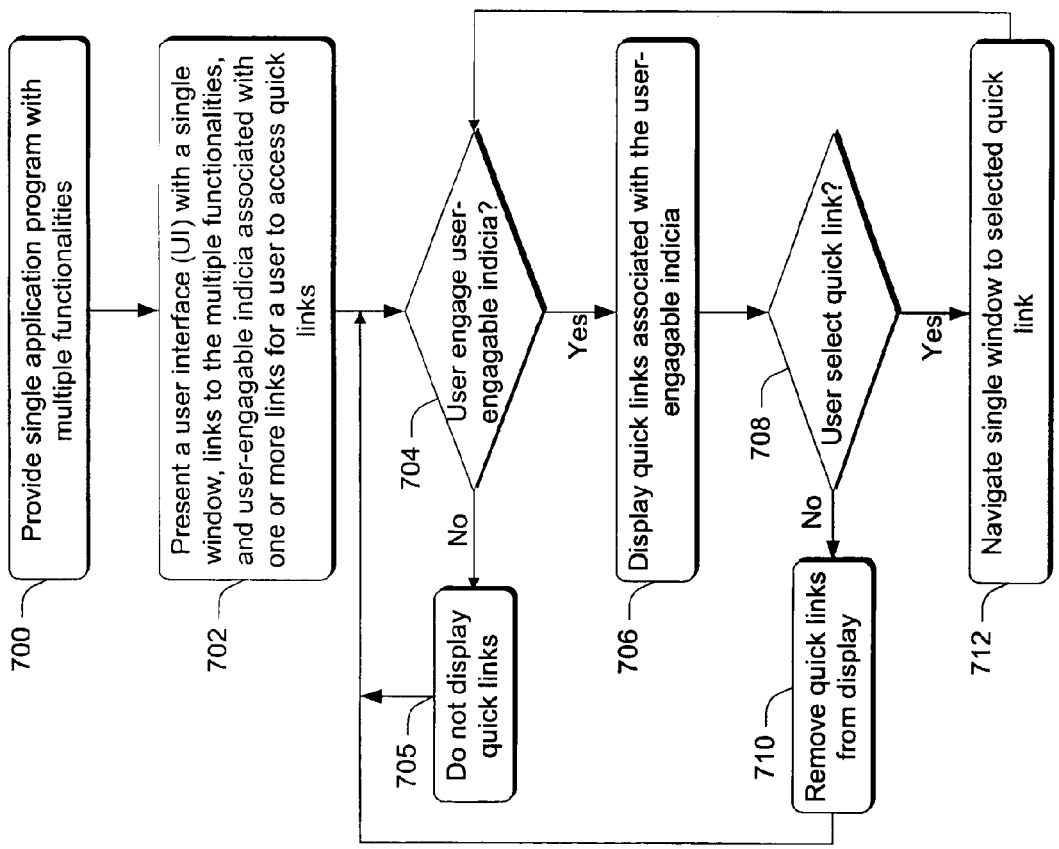

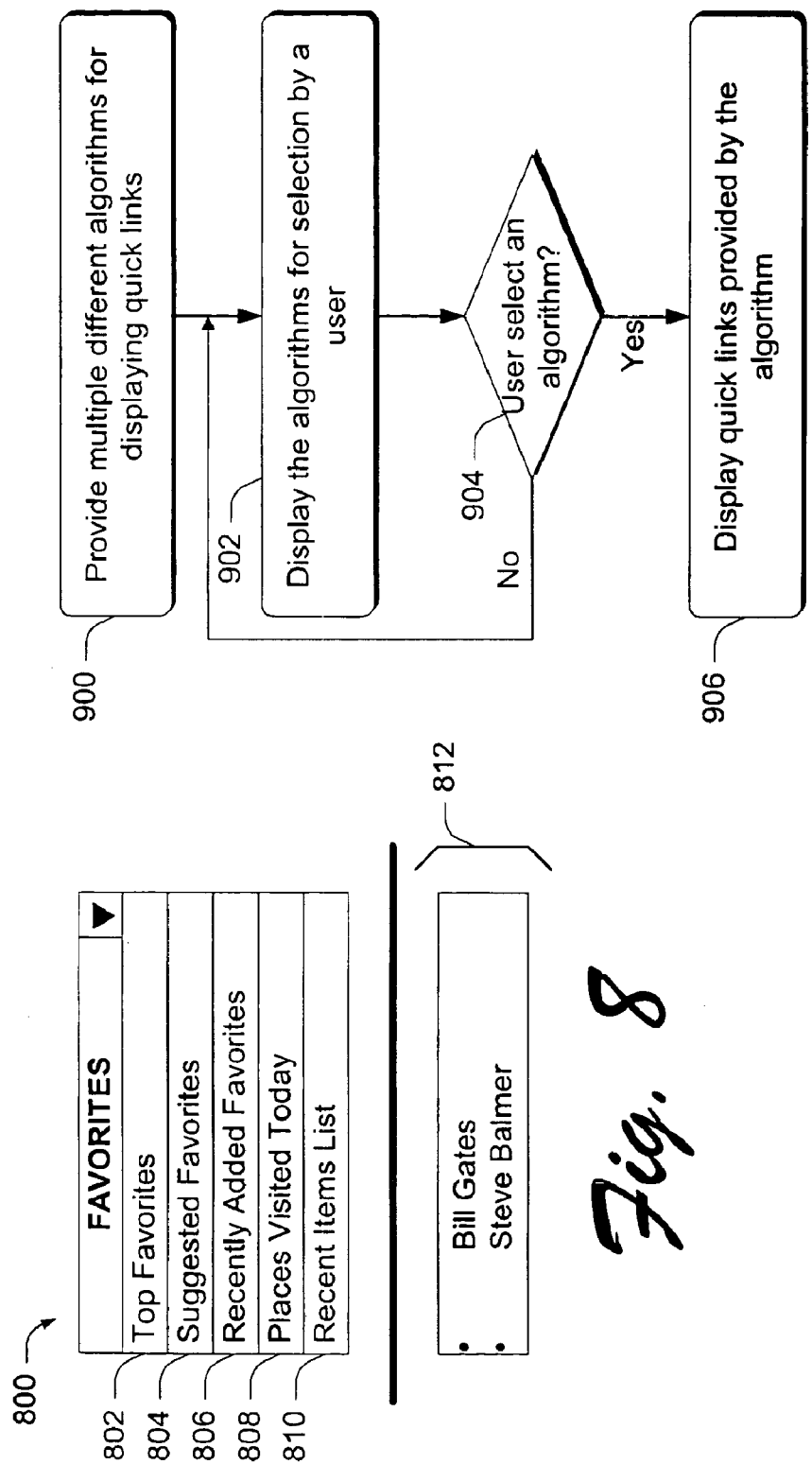

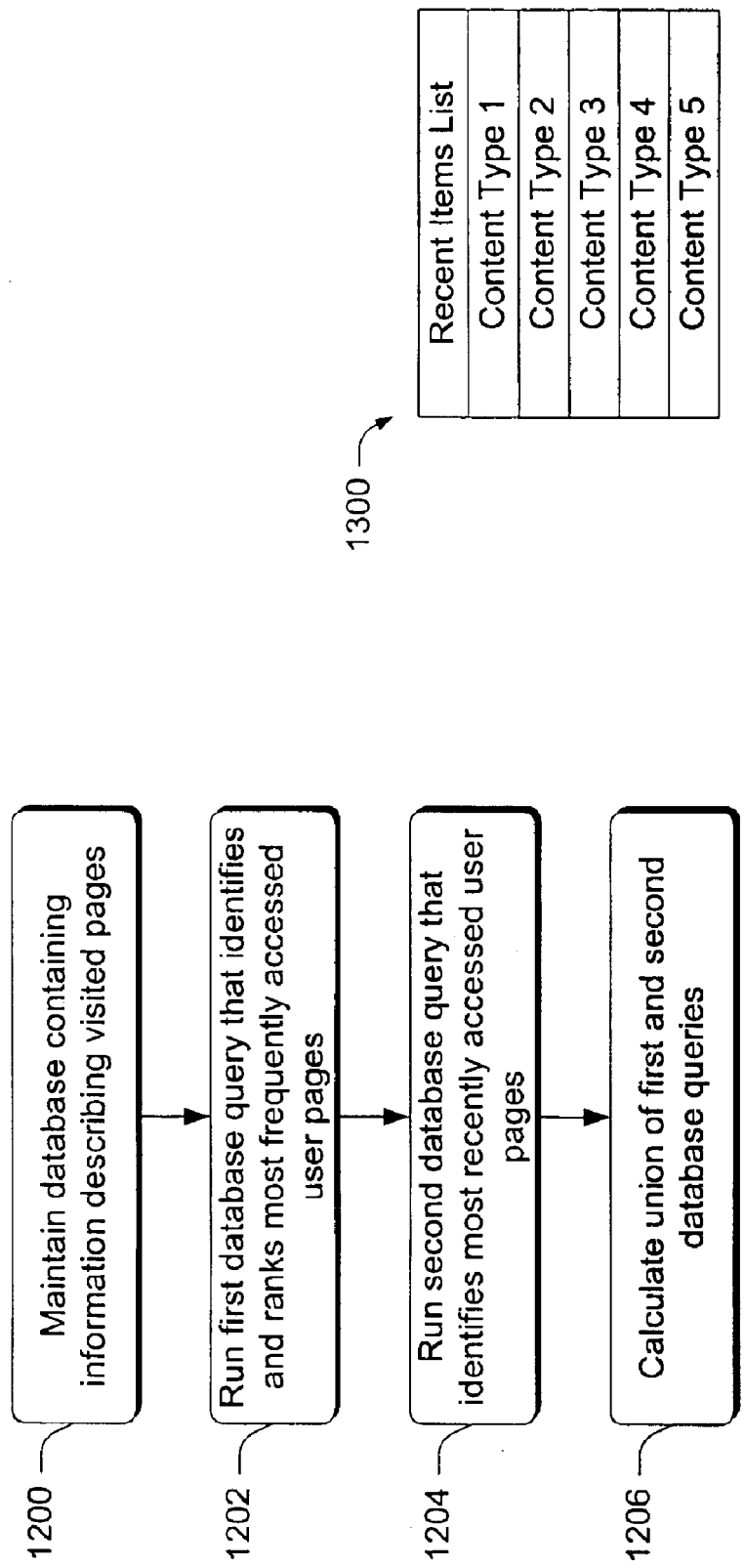

METHOD AND SYSTEMS OF PROVIDING INFORMATION TO COMPUTER USERS

RELATED APPLICATIONS

The following patent applications are related to the present application, are assigned to the assignee of this patent application, and are expressly incorporated by reference herein:

U.S. patent application Ser. No. 09/599,298, entitled "Single Window Navigation Methods and Systems", and filed on the same date as this patent application;

U.S. patent application Ser. No. 09/599,299, entitled "Methods, Systems, Architectures and Data Structures For Delivering Software via a Network", filed on the same date as this patent application;

U.S. patent application Ser. No. 09/599,048, entitled "Network-based Software Extensions", and filed on the same date as this patent application;

U.S. patent application Ser. No. 09/599,813, entitled "Authoring Arbitrary XML Documents using DHTML and XSLT", and filed on the same date as this patent application;

U.S. patent application Ser. No. 09/599,812, entitled "Architectures For And Methods Of Providing Network-based Software Extensions", and filed on the same date as this patent application.

U.S. patent application Ser. No. 09/599,086, entitled "Task Sensitive Methods And Systems For Displaying Command Sets", and filed on the same date as this patent application.

TECHNICAL FIELD

This invention pertains to computerized methods and systems for providing information to computer users. More particularly, the invention concerns methods and systems for providing links to user-specific information.

BACKGROUND

As computing evolves, there is a growing demand to make the user's computing experience much more user-centric, or tailored to the particular user. Consider, for example, web browsers. Web browsers are application programs that execute on a user's computer and enable a user to navigate the web and search for content, typically in the form of web pages that are displayed on their computer. To make the user's web browsing experience more user-centric, most web browsers include what is known as a "add favorite" function in which a user can add particular web sites to a "favorites" list. When a user adds a web site or web page to their favorites list (in the form of a link), they physically create an entry in a database that maintains a URL (i.e. universal resource locator) associated with the web site or page. Anytime a user wishes to return to one of these web sites or pages, they simply pull up their "favorites" list, click on the appropriate link, and their web browser obtains and displays a web page that corresponds to the link.

Another way that web browsers attempt to create a user-centric experience is by keeping track of a very limited amount of so-called "history data" pertaining to the user's historical browsing activities. History data might include, the last three web sites that were browsed by the user. The user can typically view this information by clicking on a feature that provides a drop down menu that lists links to the browsed sites. For example, on the web browser's navigation bar, there is typically a "back" and "forward" button that can be clicked by the user to navigate backward or forward among entries that are maintained in a navigation stack that keeps track of the user's browsing activities. The "back" and "forward" buttons can also have drop down menus associated with them that enable the user to display a drop down menu that might include links for the last three sites that the user encountered. By selecting one of these links, the user's browser displays the corresponding web page.

While these solutions provide a very basic user-centric functionality, they fall far short of providing a versatile, intelligently flexible and dynamic system. For example, many of these systems require the user to initiate or take some action in order for particular links to appear (i.e. the user necessarily, must add a link to their favorites list). In addition, many of these systems are unintelligent in the way that they present information or links to the user. For example, a favorites list may have a large number of links that have been added by the user. When a user attempts to find a link to a favorite web site, their browser will typically present them with all of the links that are in their favorites list. It is then up to the user to find the appropriate link so that they can select it.

Another challenge in the general area of information use is that which is posed by the move toward context-aware computing systems. Context-aware computing systems are those systems that provide services to a user based upon their context. In the future, information processing systems are going to have to be sensitive to the user's desire to accomplish tasks in context-aware systems. For example, it may be desirable to provide services to a user without requiring the user to change their context in order to consume the services. As an example, consider the following scenario. A user is working in a word processing application on a particular document of interest. The document is provided by an application program that is executing on the user's computer and that displays the document in a window that is defined by the program. Consider now that the user receives four or five email messages during the course of working on the document. In order to view indicia of these email messages (i.e. the "From" and "Subject" fields), in today's computing environment, the user is typically required to pull up their email application program which separately displays a different window that includes the indicia that the user wishes to view; This is a "modal" operation in that the user is required to temporarily quit working on their document in the word processing application program so that, they can view information provided by the email application program. Thus, the user is undesirably required to change their context. This invention arose out of concerns associated with improving methods and systems that provide information to computer users.

SUMMARY

Methods and systems of providing information to computer users are described. In one embodiment, a user interface is provided having a display area that permits a user to accomplish various tasks. Individual tasks can be associated with individual different functionalities which can enable the user to accomplish tasks in different user contexts, e.g. word processing tasks, email tasks, web browsing tasks and the like. The different tasks can advantageously pertain to different content types or document types. When a user is working within a particular context, they can view quick links that are associated with one or more of the different contexts without having to change their particular context. By clicking on a quick link, the user then can automatically navigate to the context associated with the quick link so that they can then accomplish context-specific tasks. Advantageously, the various functionalities or contexts can be provided by a single application program that also manages the user's navigation activities to and between the different functionalities.

In various embodiments, a user can select from among a number of different algorithms that affect which quick links are displayed. The algorithms can advantageously deploy across different content types. The different algorithms include a "Top Favorites" algorithm that presents quick links based on items on their favorites list visited most often by a user in combination with items that have been recently added by a user to their favorites list; a "Suggested Favorites" algorithm that presents quick links based on items visited most often by a user in combination with items that have been recently visited by a user; and a "Recent Items List" that presents quick links to various different documents of different content types that were last visited by the user.

BRIEF DESCRIPTION OF THE DRAWINGS

FIG. 6 is a diagram of an exemplary user interface in accordance with one specific implementation.

FIG. 7 is a flow diagram that describes steps in a method in accordance with one described embodiment.

FIG. 8 is a diagram of an exemplary user favorites interface.

FIG. 9 is a flow diagram that describes steps in a method in accordance with one described embodiment.

FIG. 12 is a flow diagram that describes steps in a method in accordance with one described embodiment.

FIG. 13 is a diagram that illustrates the concept of a "Recent Items List."

DETAILED DESCRIPTION

Overview

Figure 1:
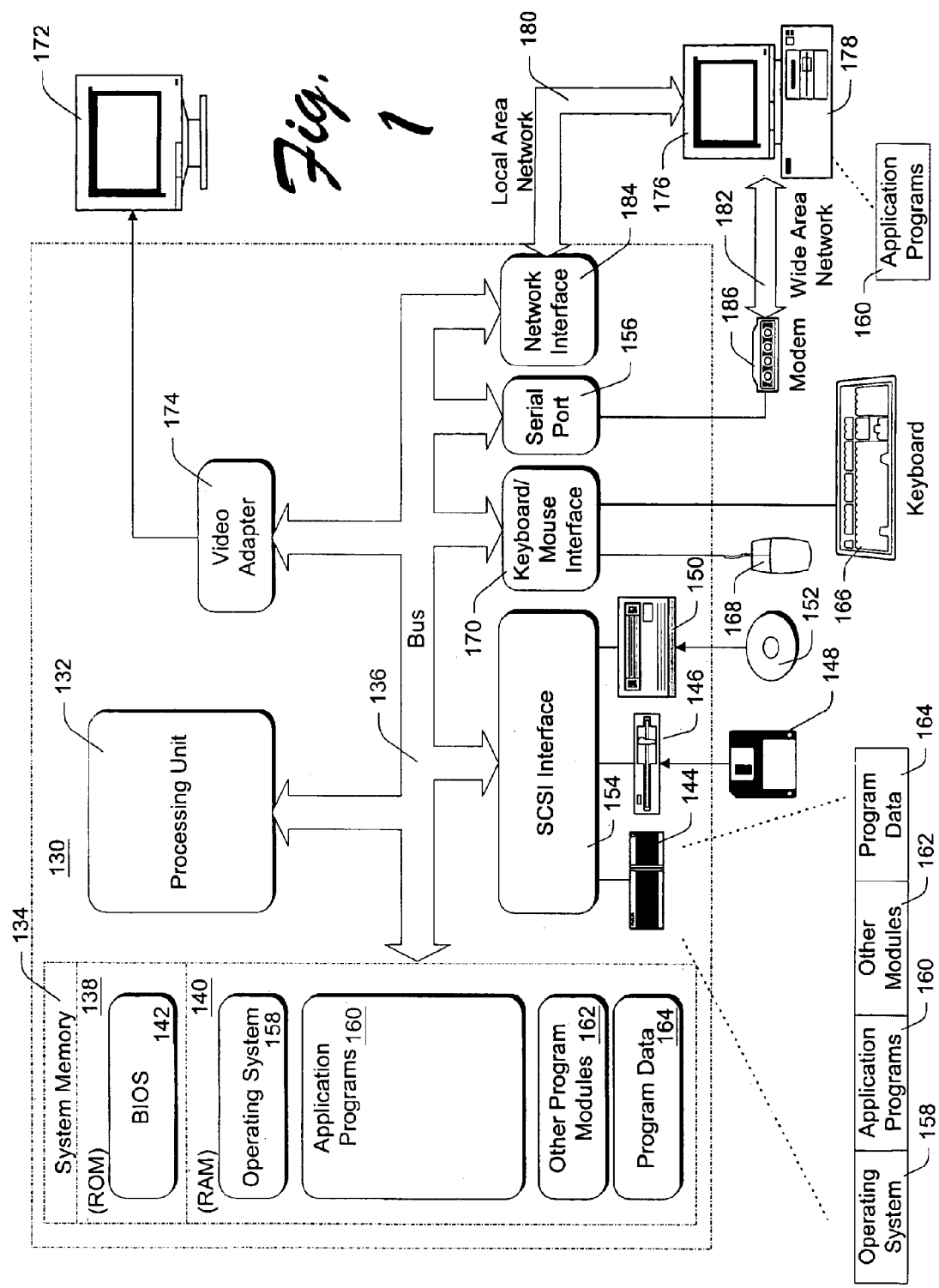
FIG. 1 is a block diagram of an exemplary computer system that can be used to implement various described embodiments.

In various embodiments described just below, novel methods and systems provide so called browsable "quick links" to user-related data. The quick links can be advantageously deployed in a manner in which the user can browse the quick links without having to change or modify their current computing context. The quick links can be provided across multiple different content types, e.g. document types. Thus, a user can, in some instances, view quick links associated with different content types without having to change their current computing context, i.e. without having to change a document of a particular content type in which they happen to be working.

In one particularly advantageous embodiment, multiple different functionalities can be provided by a single application program. The multiple different functionalities enable a user to accomplish multiple different tasks within the context of a single application program. This single application program might, for example, provide multiple document-centric functionalities, e.g. an email functionality, word processing functionality, and web browser functionality.

In this example, a user working within the web browser functionality can view quick links associated with the email functionality without having to change their web browsing context. A user is then able to select a link to automatically navigate to a particular document that is associated with that link.

Another aspect of some of the described embodiments includes an ability to build the quick links using dynamically-changing information that is not necessarily information that is demanded by the user. That is, in many systems, information will be received that pertains to a particular user. For example, in a single application program that includes an email functionality, a user may, over the course of browsing web sites, receive one or more email messages. These email messages constitute dynamically-changing information which, in this example, is not related to any actions that the user is taking. Nonetheless, quick links to the email messages can be advantageously displayed for the user while they are in the context of their web browsing activities.

Other embodiments provide intelligent browsing algorithms that are directed to displaying quick links that are very likely to be of interest to a user. These intelligent browsing algorithms can be advantageously deployed in connection with multiple content-type systems so that the algorithms are adaptable to and address the different content types.

Thus, the described embodiments provide very powerful methods and systems that greatly enhance the user's computing experience by, among other things, specifically tailoring the user's computing experience to their particular context. Flexibility is enhanced by providing, in some instances, systems that are configured to work within a context-sensitive computing environment that contains multiple different functionalities that are selectable for use by a user.

Exemplary Computer System

FIG. 1 shows an exemplary computer system that can be used to implement the embodiments described herein. Other computer systems can, however, be used. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Viewable Links Across Multiple Content Types

In one embodiment, software provides various quick links that are viewable by a user without changing their current computing context. The quick links can advantageously pertain to another context that is different from a context in which the user is currently computing. For purposes of this document, a "context" can be considered as a functionality that enables a user to complete a particular computing task. Exemplary contexts include, without limitation, word processing contexts, browsing contexts, email contexts and the like. Thus, while a user is in one particular context, they have the ability to view quick links that pertain to another different context without changing their current computing context.

As an example, consider the following. A user is currently working on a document in a word processor. During the course of working on the document, the user receives an email message from a friend. In the past, the user would have to temporarily stop their current computing context, e.g. by exiting or pausing a word processing window, and pulling up an email window to view indicia of the email message (i.e. the "From" and "Subject" fields). In accordance with this example, a user can view quick link that are associated with the different context without changing their current context. In this specific case, the user can view links that are associated with the email message (e.g. the "From" and "Subject" fields) without exiting the word processing window or changing their word processing context.

Figure 2:
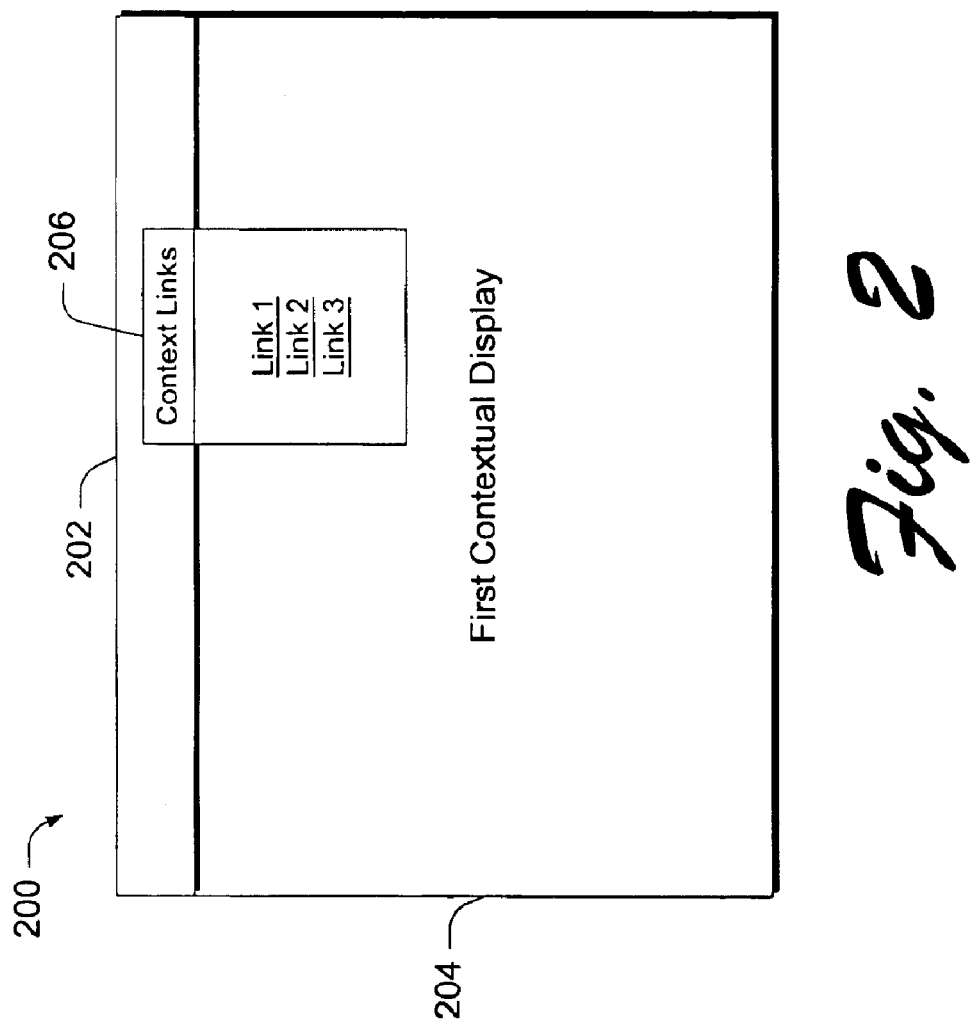
FIG. 2 is a diagram of an exemplary user interface that can be provided in accordance with one described embodiment.

FIG. 2 shows but one exemplary user interface 200 that can be provided in accordance with this example. The user interface is implemented in software that is executable on a user's computing device, e.g. a personal computer, although any computing device can suffice. Interface 200 includes, in this example, a tool bar 202 and a display area 204. Display area 204 can be used by the user to engage in tasks associated with a first context and, in this example, is designated "First Contextual Display." Exemplary tasks can be any suitable tasks in which a computer can engage. Exemplary non-limiting tasks were mentioned above. Tool bar 202 includes, in this example, user-engagable indicia 206 that can enable a user to view quick links that are associated with one or more contexts that are different from the first context and each other. In this example, the indicia comprises one or more drop down menus 206. Each drop down menu can be associated with a different context, i.e. different task, in which a user can engage. In this particular example, and for the sake of brevity, only one indicia or drop down menu is shown.

In operation, a user who is working within a particular context in display area 204 may desire to view links associated with a different context. In this case, the user simply clicks on the drop down menu 206 to automatically view one or more quick links that are associated with a different context. When the user clicks on the menu 206, their context within the display area does not change. That is, they are able to view the quick link or links associated with the different context or contexts, without having to change their own context. To this extent, the display of the quick links associated with the other context is done in a modeless fashion. That is, when the user displays the quick links, they are not-required to temporarily leave their current context. They may continue working within or at least view their current context in the display area 204 while the quick links are displayed.

As an example, consider again the user who is working in a Word processor on a particular document and receives an email message from a friend. Instead of having to leave the current document displayed in display area 204, the user simply clicks on the menu 206 to view of list of quick links that correspond to the email messages that the user has received. In this way, the user can check their list of email messages (or view links that pertain to one context) while working in a completely different context. The user can then click on a quick link to be navigated to the new context which, in this case, is the email message.

Figure 3:
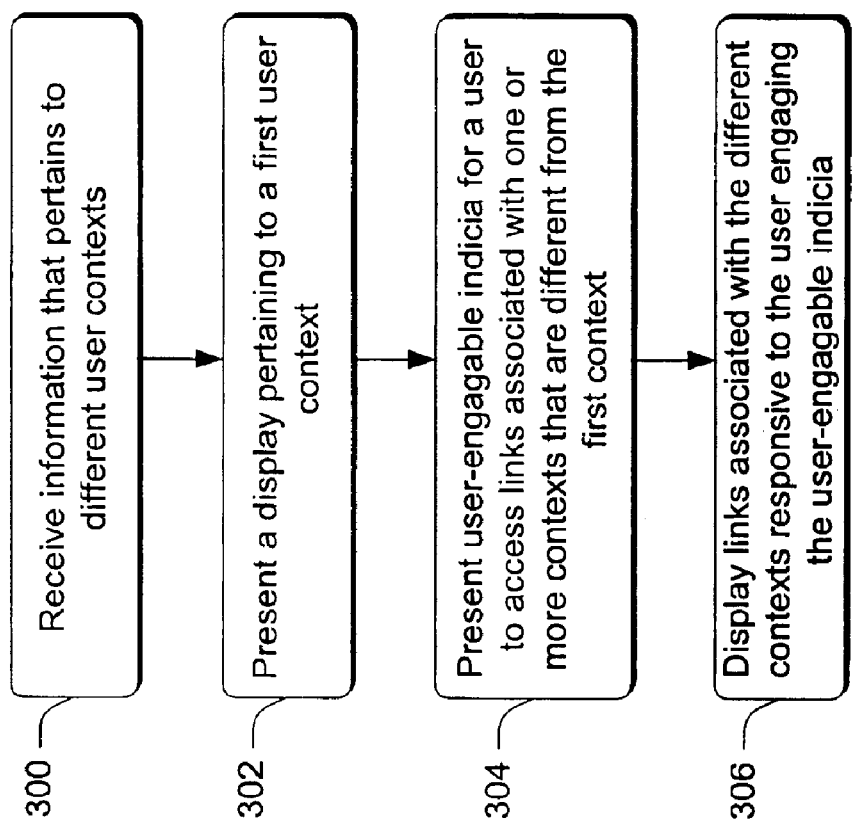
FIG. 3 is a flow diagram that describes steps in a method in accordance with one described embodiment.

FIG. 3 is a flow diagram that describes steps in a method in accordance with the described embodiment. The illustrated method can be implemented in any suitable hardware, software, firmware, or combination thereof In the illustrated example, the method is implemented in software.

Step 300 receives information that pertains to different user contexts. This information can comprise any information that can be associated with any number of different user contexts. Advantageously, the information can comprise dynamically changing information. For example, the information can comprise "incoming" information that is received by the user's computer while the user is working within one context (e.g. receiving an email message while working in a word processing document). Such information can also comprise information that is or is not generated by the user themselves. The information can also comprise time-sensitive information (e.g. calendar appointments for a particular day or time frame), in which case the information would appear when the appointments start in the immediate future. Further, the information can comprise information concerning content that the user is working with and information about the content's use. Step 302 presents a display on the user's computer that pertains to a first user context. The display can be any suitable display with which the user can interact to accomplish a task. Step 304 presents user-engagable indicia that enables a user to access quick links associated with one or more contexts that are different from the first context. The links can be associated with the information that is received at step 300. Any suitable user-engagable indicia can be presented. In the example given above, the indicia is displayed in the form of a drop down menu. Step 306 displays quick-links that are associated with the different contexts responsive to a user engaging the user-engagable indicia. In the above example, this step can be implemented when the user clicks on the drop down menu that is associated with the different contexts. Advantageously, steps 304 and 306 are implemented without changing the user's present computing context. So, in the above example, this step is implemented by displaying quick links to the user's incoming email messages without requiring the user to change their word processing context.

Exemplary Implementation

In accordance with one specific implementation, software provides a user interface (UI) that presents a user with a single navigable window that can be navigated between multiple different functionalities by a user. The single navigable window and different functionalities are advantageously provided by a single application program which greatly facilitates integration of the different functionalities. The single navigable window contains user-engagable indicia that enables a user to view quick links that are associated with different functionalities, without having to change their current context or functionality. An exemplary single navigable window application is described in the U.S. patent application entitled "Single Window Navigation Methods and Systems", incorporated by reference above.

In the exemplary single navigable window application, a user, through the use of various navigation instrumentalities, can navigate between the functionalities and when doing so, the single window presents one of these functionalities. When this one functionality is presented to the user, the user is able, through the use of the user-engagable indicia, to view quick links associated with one or more of the other functionalities. In this particular implementation, one navigation instrumentality is provided in the form of a web browser-like navigation tool. The choice of a web browser-like navigation tool follows from concerns that navigation instrumentalities be of a type that is readily understood by most individuals familiar with computing environments. Thus, when a user first encounters the inventive navigable single window concept for the first time, they do not have to learn an unfamiliar navigation concept. Another navigation instrumentality includes links to each of the multiple different functionalities. These links are different from the quick links and can be clicked on by a user to automatically navigate the single navigable window to a selected functionality. Once the user has navigated the single window to a particular functionality, they can set about accomplishing a task within the functionality. One or more of the application links includes the user-engagabie indicia that, in turn, displays the quick links to the associated functionality.

Figure 4:
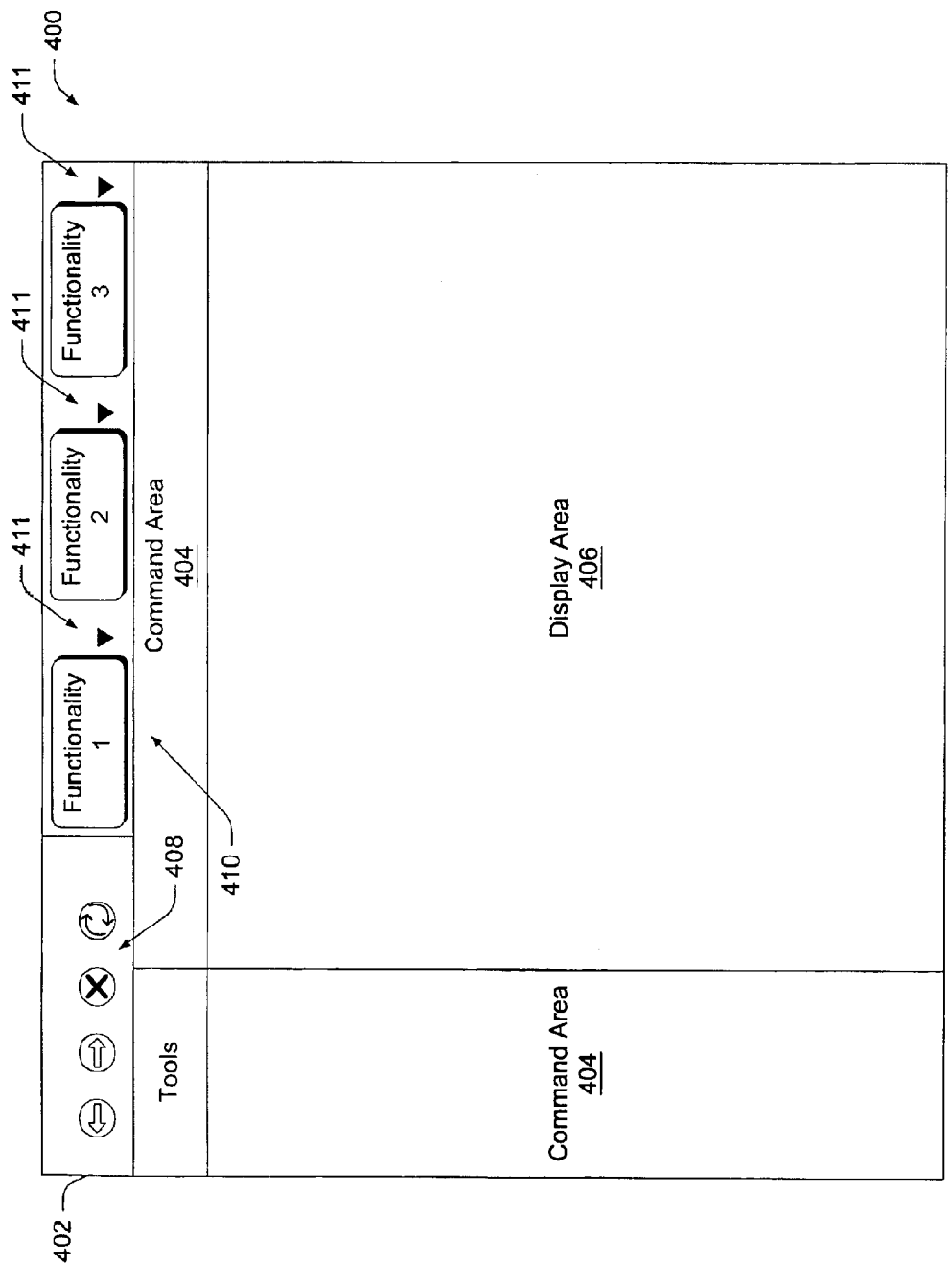
FIG. 4 is a diagram of an exemplary user interface in accordance with one specific implementation.

FIG. 4 shows but one exemplary user interface (UI) 400 in accordance with this specific implementation. It will be appreciated that other UIs could be used to implement the inventive concepts described herein and that the illustrated UI constitutes but one way of doing so. In the illustrated example, UI 400 includes a navigation bar 402, one or more command areas 404, and a display or document area 406 that constitutes the single navigable window.

Navigation bar 402 is located adjacent the top of display area 406 and contains browser-like navigation buttons 408 in the form of a "backward" button, "forward" button, a "stop" button and the like. The navigation bar can be located anywhere on the UI. Its illustrated placement, however, is similar in appearance to the placement of traditional web browsing navigation features. In addition to the navigation buttons 408, the navigation bar 402 also includes one or more links 410 to the different functionalities that are provided by the single application program and which can be accessed by the user. Individual links 410 have user-engagable indicia 411 associated with them that enable a user to view quick links that are associated with the functionality. In the illustrated example, links to three exemplary functionalities (i.e. functionality 1, functionality 2, and functionality 3) are shown and each has its own user-engagable indicia 411. It is possible, however, for less than all of the functionalities to have user-engagable indicia These functionalities are typically different functionalities that can enable a user to complete different respective tasks.

Examples of different tasks are given below in more detail. In this example, these funcionalities are advantageously all provided within the context of a single application.

In operation, to access a particular functionality, a user simply clicks on one of the links 410 and a display that pertains to the selected functionality is immediately presented in the single window display area 406. To view quick links that are associated with a particular functionality that is the same as or different from one in which the user is currently working, the user simply clicks on the corresponding user-engagable indicia 411 to see a drop down menu containing the quick links. Thus, while working within functionality 1, for example, the user could click on the user-engagable indicia 411 associated with any of functionalities 1, 2 and 3 to see their associated quick links. By clicking further on any of the quick links, the user can automatically navigate the single window to that particular link. As the user navigates from link to link or from functionality to functionality, their navigation activities are managed by a software-implemented navigation model that is described in a section entitled "Navigation Model" below.

Command areas 404 are located adjacent the top and left side of the display area 406. The command area(s) can, however, be located in any suitable location. The command areas provide commands that are both global in nature and specific to the particular context the user has selected. For example, some commands such as "search" and "help" might be considered as global in nature since they can find use in many contexts. Other commands, such as "text bold", or "forward" are more specific to the particular context that the user has selected. For the "text bold" command, the user's context may likely be a word processing context, while the "forward" command may likely be employed in an email context. The concept of context-sensitive command structures are described in more detail in the U.S. patent application entitled "Task Sensitive Methods And Systems For Displaying Command Sets", incorporated by reference above.

Briefly, however, context-sensitive command structures include command sets having one or more individual commands are automatically presented to a user depending on the user's context. Specifically, depending on the type of action the user has taken within display area 406, commands that are specific to that action will appear automatically thus obviating the need for the user to hunt through a menu structure to find commands of interest. This improves upon past approaches which always presented top level commands, even when they were not needed by the user. This is also advantageous from the standpoint of assisting users who are unfamiliar with a particular software application. In the past, these users would have to hunt through an unfamiliar menu structure to find commands that may or may not be pertinent to an action that the user desired to take. In the present case, contextually-appropriate commands are automatically presented in an interface so that a user need not worry about finding appropriate commands.

In the present example, a context-sensitive command structure in the form of a context block can be presented to the user. The context block can advantageously contain multiple algorithms from which the user can select to see different collections of links that pertain to the particular functionality in which they are currently working or one or more of the functionalities in which they are not currently working. The algorithms are designed to intelligently present links that are very likely to be of interest to the user. Exemplary algorithms are described in more detail in the "Exemplary Algorithms" section below.

EXAMPLE

Figure 5:
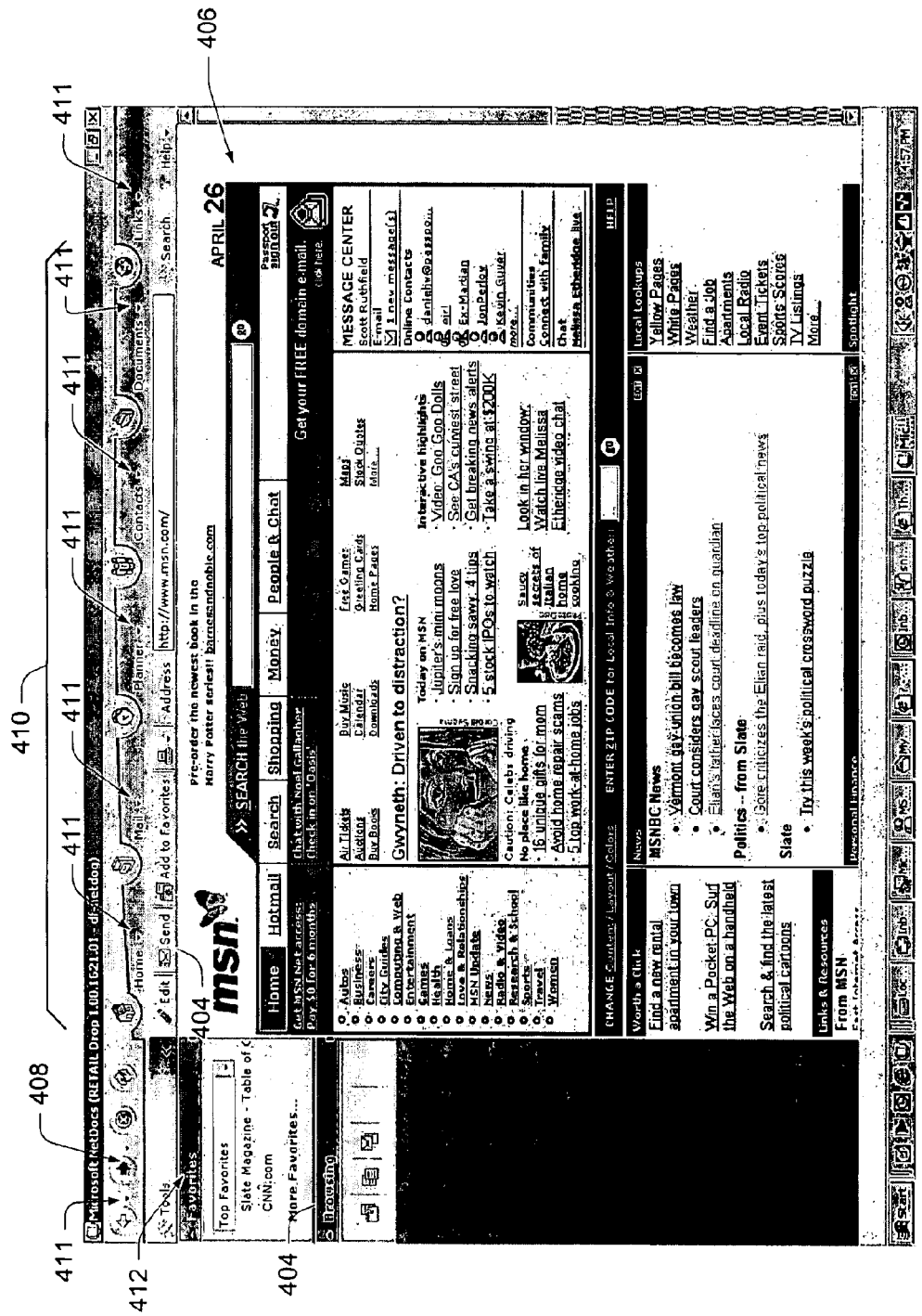
FIG. 5 is a diagram of an exemplary user interface in accordance with one specific implementation.
Figure 6:
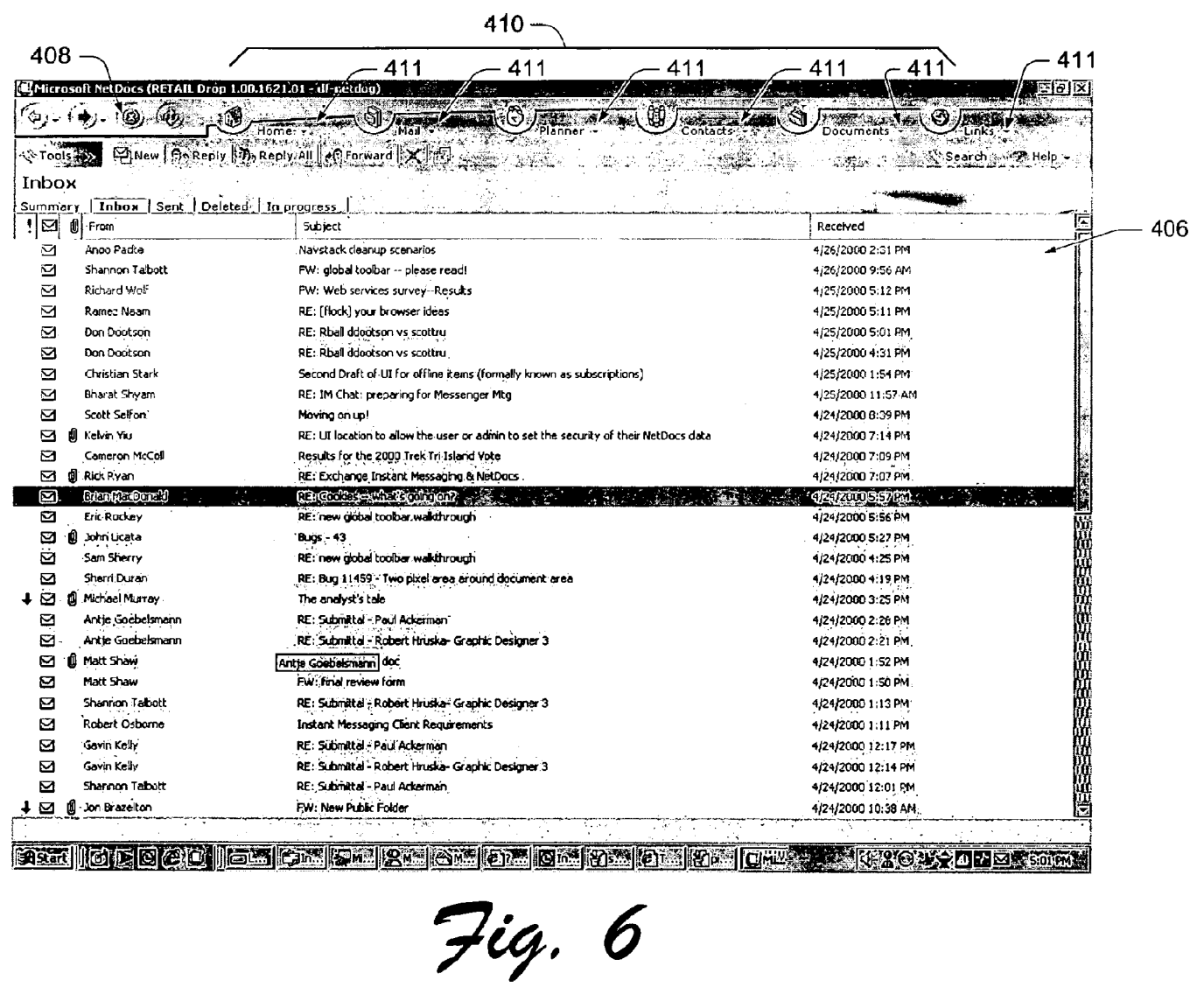

As an example of the single navigable window provided by a single application consider FIGS. 5 and 6.

In this example, the multiple functionalities 410 that can be navigated by a user include a browser functionality (indicated by the home icon), a mail functionality (indicated by the letter icon), a planner functionality (indicated by the clock icon), a contacts functionality (indicated by the people icon), a documents functionality (indicated by the folder icon), and a links functionality (indicated by the world icon). These illustrated functionalities are so-called "document-centric" functionalities because they are defined around, a type of document that a user interacts with, e.g. a Web page document, an email document, a calendar document, etc. Each of the links 410 to the functionalities has an associated user-engagable indicia 411 in the form of a drop down menu that shows quick links to the various functionalities.

FIG. 5 shows an example of a display that is rendered in the display area 406 when a user clicks on the link to the browser functionality. By clicking on the link (i.e. the home icon) to the browser functionality, single application program software executing on the user's computer executes to implement a browser functionality. In this example, the browser functionality displays the user's home page in display area 406. Notice also that navigation buttons 408 are provided for navigation within the current and between the different selectable functionalities.

The command areas 404 contain command sets that include commands that are specific to the context that the user has selected. In this example, the user's context is a browsing context. Accordingly, the leftmost command area contains commands that are specific to the browsing functionality. Such commands include ones that a user would normally expect to find in a web browser. In addition, the leftmost command area 404 shows a context block 412 labeled "Favorites" that includes a drop down menu that can enable a user to select between multiple different algorithms that intelligently present links associated with their current context. In this example, context block 412 indicates that the user has selected a "Top Favorites" algorithm that lists their top favorite web sites. An exemplary "Top Favorites" algorithm is described below in the "Exemplary Algorithms" section.

Notice also that the command area 404 adjacent the top of display area 406 also contains commands that are specific to the browsing context, i.e. "Add to Favorites" and an address well in which the user can type a URL of a particular destination web site.

FIG. 6 shows an example of a display that is rendered in the display area 406 when the user clicks on the link to the mail functionality (i.e. the folder icon). By clicking on this ink, single application program software executing on the user's computer executes to implement the mail functionality. In this example, the mail functionality displays a user's in box with messages that have been received by the user. Notice that the leftmost command area has been minimized by the user and that the command area adjacent the top of the display area 406 contains commands that are specific to the user's current context, e.g. "New" for generating a new email message, "Reply" for replying to an email message, "Reply to All" for replying to all recipients of an email message and the like.

Likewise, although not specifically illustrated, the user could have displays for the planner, contacts, documents, and links functionalities presented in the display area 406 by simply clicking on the links to these specific functionalities.

The navigation bar 408 provides the user with the ability to navigate through these different functionalities in a browser-like manner.

It is important to note that the above example constitutes but one exemplary way in which multiple different functionalities and associated quick links can be presented to a user within the construct of a navigable structure. It should be understood that the specifically illustrated functionalities (i.e. browser, mail, planner etc.) constitute specific examples of different functionalities that are capable of being incorporated into the single application program that provides the navigable window and should in no way limit the scope of the claimed subject matter to only the specifically illustrated and described functionalities. Accordingly, other different functionalities and associated quick links can be employed.

FIG. 7 is a flow diagram that describes steps in a method in accordance with this described embodiment. The illustrated method can be implemented in any suitable hardware, software, firmware, or combination thereof. In the illustrated example, the method is implemented in software.

Step 700 provides a single application program with multiple different functionalities. The functionalities, as pointed out above, are advantageously different so as to enable a user to accomplish different tasks. One specific non-limiting example of different functionalities was given above in the context of document-centric functionalities that enable a user to make use of browser, mail, planner, contacts, documents, and links functionalities. Step 700 can be implemented by configuring a computing device, such as a user's computer, with the single application program having the multiple different functionalities. This step can also be implemented by providing a software platform in the form of a generic single application shell that is extensible and adaptable to receive different extensions or software modules that embody various different functionalities as described in the U.S. patent applications entitled "Single Window Navigation Methods and Systems", "Methods, Systems, Architectures and. Data Structures For Delivering Software via a Network", and "Network-based Software Extensions" incorporated by reference above. These different extensions are then presented to the user in the context of the single application having the multiple different functionalities.

These extensions can be delivered to the platform in any suitable way and through any suitable delivery mechanism. For example, one way of delivering the various extensions or functionalities is to deliver them via a network such as an Intranet or the Internet Regardless of the manner in which the single application is provided, step 702 presents a user interface (UI) with a single window, links to the multiple different functionalities, and user-engagable indicia associated with one or more of the links. The user-engagable indicia, as described above, enables a user to access quick links associated with one or more of the functionalities. The UI can also advantageously include navigation instrumentalities that enable a user to navigate between the different functionalities in a browser-like manner. FIGS. 4–6 give specific examples of an exemplary UI that can be used in accordance with the described embodiment. Step 704 ascertains whether a user has engaged any of the user-engagable indicia for displaying the quick links. If the user has not engaged any of the user-engagable indicia, then step 705 does not display any of the quick links. The user-engagable indicia can be continually displayed so that a user is free to select one. If the user has engaged any of the user-engagable indicia (e.g. by clicking on a drop down menu 411 associated with one or more of the functionalities), then step 706 displays the quick links that are associated with the user-engagable indicia. Step 708 ascertains whether the user has selected a particular quick link from the displayed quick links. If the user has not, then step 710 can remove the display of quick links and branches back to step 704. This step can be implemented automatically (e.g. by removing the quick links display after a determinable amount of time) or manually (by enabling the user to close the quick links display through some predefined action). If the user has selected a particular quick link, then step 712 navigates the single window to the selected quick link and displays a document associated with the quick link for the user. Step 712 then returns to step 704. It will be appreciated that step 706 can also remove quick links that are displayed responsive to a user engaging the user-engagable indicia.

Hence, in this example, multiple different functionalities are provided by a single application program that provides a single navigable window that can be navigated among the different functionalities. This permits a user to accomplish different tasks without having to pull up and manage multiple windows. All of the functionalities, in this example, are provided within the single window as desired by the user. To assist the user in operating within the single window environment, one or more of the functionalities have user-engagable indicia associated with them that enables a user to view quick links that pertain to a functionality that is different from a functionality in which they happen to be working. Advantageously, the user is able to view the quick links without having to change their current context. For example, in the document-centric example described in FIGS. 5 and 6, a user can view quick links associated with upcoming appointments in their calendar functionality while browsing the web with their browser functionality. When they view the links to the appointments, their context remains within the browser functionality. If the user chooses, they may click on a particular quick link to an appointment which then changes their context and navigates the single navigable window to a document that displays more information about the appointment.

Navigation Model

In the embodiment described directly above, a navigation model is utilized to manage a user's navigation activities within the single application that provides the multiple different functionalities. Although any suitable navigation model (as will be understood by those of skill in the art) can be used, in the described embodiment a so-called "back-and-truncate" navigation stack is used. The basic concept of a back-and-truncate model is known and forms the basis for many different web browsers on the market today. Essentially, the back-and-truncate model makes use of a navigation stack that is truncated when the user navigates back n times and then forward to a new document. An explanation of the navigation model that is employed in the present example is given is the U.S. patent application entitled "Single Window Navigation Methods and Systems", incorporated by reference above.

Exemplary Algorithms

In one embodiment, various inventive algorithms are employed to ensure that the quick links that are displayed for the user are intelligently selected for display. Many of the algorithms use dynamically changing information as a basis for ascertaining what quick links to display for the user. Dynamically changing information can include such things as incoming information (e.g. information that is received by the user's computer) and information concerning future activities or events (e.g. calendar appointments). The dynamically changing information is processed by various algorithms to provide the quick links that can be selected for display for the user.

As an example, consider the document-centric single navigable window example above. In that example, the different functionalities include a planner functionality and an email functionality. The planner functionality typically employs information that can be considered as information concerning future activities or events. The email functionality employs information that can be considered as incoming information. The inventive algorithms take into account the nature of this information and attempt to provide an intelligently arranged collection of quick links for the user. Additionally, at least some of the inventive algorithms are employable across different content types. That is, some of the algorithms can provide quick links to different content types. An example of this is given in the "Recent Items List" section below.

The algorithms described below help to determine a set of quick links to provide for users. The inventive algorithms can work in multiple different ways. For example, the algorithms can work:

As a filter or union of filters on a stored collection or collections of data (e.g. a collection of mail messages or web page favorites); or As data tracked in memory about a current application session, usually across multiple types of data (e.g. web pages, calendar appointments, and email messages, for example)

Multiple Selectable Algorithms

In one implementation, a user is presented, via a UI, with multiple algorithms from which they can select to have quick links displayed. The different algorithms can display different collections of quick links depending on the specifics of the algorithm selected by the user. Advantageously, the multiple selectable algorithms can be employed in connection with the single navigable window application described above. Hence, the different selectable algorithms can be employed across different content types.

Consider for example FIG. 8 which shows an exemplary user interface 800 designated as "Favorites". Interface 800 corresponds to the "Favorites" context block 412 of FIG. 5. Interface 800 includes multiple different algorithms that can be selected by a user. When a user selects a particular algorithm, they are presented with a display of quick links that are provided by that specific selected algorithm. In the illustrated example, four exemplary algorithms are shown: a "Top Favorites" algorithm 802, a "Suggested Favorites" algorithm 804, a "Recently Added Favorites" algorithm 806, a "Places Visited Today" algorithm 808, and a "Recent Items" algorithm 810. The "Top Favorites", "Suggested Favorites", and "Recent Items List" algorithms are discussed in specific sections below in more detail. It will be appreciated that the listed algorithms can be provided in any suitable way, e.g. in the illustrated UI or in drop down menus similar to the other quick links.

In the single navigable window implementation where a user's context is capable of changing from functionality to functionality; it is important to note that some of the different selectable algorithms, when selected by a user, provide quick links that are particular to the user's present context. That is, as the user's context changes from functionality to functionality, so too do the collection of quick links that are provided by some of the algorithms. For example, if a user is working in their email functionality, then by selecting "Top Favorites", they can see a list of their top favorite email messages. In the present example, their favorite email messages can be displayed directly under interface 800 in a display 812. If a user navigates to the web browser functionality and selects the "Top Favorites" algorithm, they can see a list of their top favorite web sites. Thus, the algorithms are capable of being employed in connection with and across different content types (e.g. email messages and web pages).

FIG. 9 is a flow diagram that describes steps in a method in accordance with this described embodiment. The illustrated method can be implemented in any suitable hardware, software, firmware, or combination thereof. In the illustrated example, the method is implemented in software.

Step 900 provides multiple different algorithms for displaying quick links. The algorithms that are provided can be any suitable algorithms. Advantageously, some if not all of the algorithms are designed to be employed in connection with and across different content types. In addition, some of the algorithrms can display quick links to different content types, as will become apparent below in the "Recent Items List" section. Step 902 displays the multiple different algorithms for selection by a user. The algorithms can be displayed in response to the user actively pulling them up, or they can be displayed automatically when the user's context indicates that the algorithms might be useful to the user. Step 904 ascertains whether the user has selected an algorithm. A user can select an algorithm by simply clicking on the appropriate algorithm. If the user has not selected an algorithm, the method can branch back to step 902. Alternately, the method can remove the display of algorithms. If the user'selects an algorithm then step 906 displays quick links that are provided by the algorithm. The quick links can include links that are within the user's present context as well as links that are not within the user's present context.

Top Favorites

The inventive Top Favorites algorithm embodiments enable a user to see quick links that are associated with items on a favorites list that have been visited most often by the user as well as items that have most recently been added by the user to a favorites list. To determine which items have been visited "most" often by a user, any suitable metrics can be used. For example, one metric might look at a one-week or a one-month time period and set a predetermined threshold at ten.

In this example, an item that is visited more than ten times in the defined time period would be considered as being an item that is visited most often. Similarly, to determine which items have been "most" recently added, any suitable metrics can be used, e.g. added within the past 2 or 3 days. This algorithm recognizes that items of particular interest to a user can include not only those items that a user visits frequently, but items that they recently added to their favorites list as well.

Figure 10:
FIG. 10 is a diagram that describes a portion of a database in accordance with one described embodiment.

The Top Favorites algorithm can be implemented as follows. A database maintains "favorite" entries in which a user has indicated an interest. The database can be maintained in a permanent store. FIG. 10 shows a number of different exemplary database entries at 1000 that form a portion of such a database. The database entries include a link field 1002 that holds the information describing the link. Here, such information comprises the link's URL. There are also one or more fields 1004 for maintaining information regarding how frequently a user accesses a particular link. In this example, four exemplary fields are provided—each corresponding to a one-week time period. The "1 Wk" field can hold a value associated with a user's access frequency during the preceding week; the "2 Wk" field can hold a value associated with a user's access frequency two weeks ago and so on. Additionally, a "Date Added" field 1006 includes the date when the user added the link to their favorites list.

In this example, database entries are ranked according to how frequently a user has accessed them. More frequently accessed links are ranked higher than less frequently accessed links. One way of ranking links is to calculate a score for each link that counts the number of times a user has accessed a link, weighting the more recent accesses heavier than the less recent accesses. Each score is then ordered in terms of highest to lowest to provide a ranked list of popular favorites with more popular links appearing toward the top of the list and less popular links appearing toward the bottom of the list or not appear on the list at all. Individual links can now be identified based upon how popular they are as measured by the user's access frequency. Next, the most recently added entries are ascertained in accordance with definable parameters. For example, a search query might specify that entries added within the last two weeks are to be identified. This provides a list of most recently added favorites. This list, and the links from the list of popular favorites are then combined to provide a collection of favorites that includes not only the most popular links (as determined by the user's access frequency), but the most recently added links as well. The latter portion of the list ensures that links that are of current interest to the user populate the "Top Favorites" list.

Figure 11:
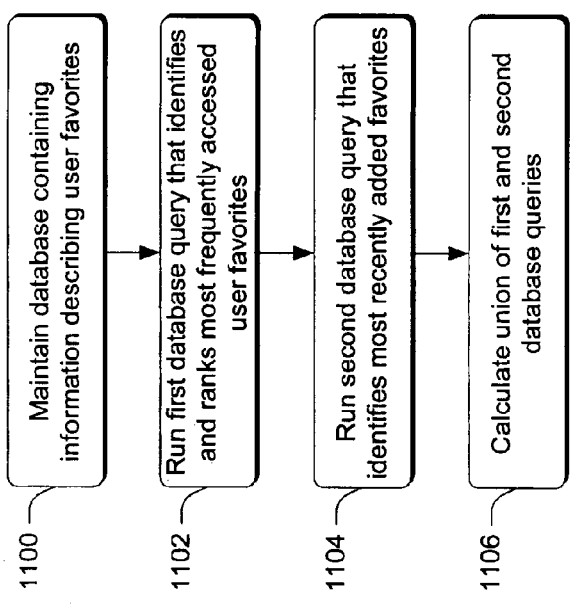
FIG. 11 is a flow diagram that describes steps in a method in accordance with one described embodiment.

FIG. 11 is a flow diagram that describes steps in a method in accordance with this embodiment. This method can be implemented in any suitable hardware, software, firmware, or combination thereof In the present example, the method is implemented in software. Step 1100 maintains a database containing information describing various user favorites. This information can include links to the favorites (such as URLs and the like), as well as information that describes the user's access frequency and when the favorite was added by the user to their favorites list. Exemplary database entries are shown in FIG. 10. Step 1102 runs a first database query that identifies and ranks the most frequently accessed user favorites. Step 1104 runs a second database query that identifies the most recently added favorites. Step 1106 then calculates a union of the first and second queries to provide a user's "Top Favorites" list.

Suggested Favorites

In another embodiment, a "Suggested Favorites" algorithm enables a user to see links that are associated with items that have been visited most often by the user as well as items that have visited most recently by the user. This algorithm is similar to the "Top Favorites" algorithm, except that instead of running a database query that identifies the most frequently and recently visited favorites (step 1104), a database query is run that identifies the most recently browsed items. Thus, this algorithm recognizes that items of particular interest to a user can include not only those items that a user adds to a manual list and visits frequently, but also items that they most recently visited or visit often and do not add to this list. To determine which items have been most recently visited, any suitable metric can be used, e.g. visited within the past 2 or 3 days.

In an exemplary implementation, a "Date Last Accessed" field 1008 (FIG. 10) can be included in the database 1000. Entries in this field include the dates when a user last accessed a particular item.

FIG. 12 is a flow diagram, that describes steps in a method in accordance with this described embodiment. This method can be implemented in any suitable hardware, software, firmware, or combination thereof. In the present example, the method is implemented in software. Step 1200 maintains a database containing information describing various visited pages. This information can include links to the pages (such as URLs and the like), as well as information that describes the user's access frequency and when the page was last accessed by the user. Exemplary database entries are shown in FIG. 10. Step 1202 runs a first database query that identifies and ranks the most frequently accessed user pages. Step 1204 runs a second database query that identifies the most recently accessed pages. Step 1206 then calculates a union of the first and second queries to provide a user's "Suggested Favorites" list.

Recent Items List

In one embodiment, a "Recent Items List" is provided for a user. This embodiment is particularly useful in the context of the single window application program that provides multiple different functionalities. Recall that each of the different functionalities can have different associated content types, e.g. email messages, calendaring items, contacts, web pages, etc. The "Recent Items List" tracks, in memory, information pertaining to one or more of the last document of a particular content type that the user visited. Advantageously, the application program can store a link to the most recently browsed document of every content type that the application supports. For example, if an application contains email, calendaring, browsing, and contact functionalities, the "Recent Items List" can contain links to each of the most recently accessed documents of the particular content types. This can be extended to include more items in each list or other kinds of extended content: as new functionalities are added to the application, the list could expand to include those types as well. In addition, this algorithm can be extendible to incorporate newly created document types. For example, if a user adds an extension that provides a new document type, this algorithm can ensure that documents of the newly-created document type are included in the "Recent Items List."

Consider, for example, FIG. 13 which shows an exemplary "Recent Items List" 1300 that can be maintained in memory. In this example, the list contains five entries, one for each content type that is supported by the application. Each of the entries is a link that is associated with the most recently viewed document of a particular content type. For example, content type 1 night be a link to the last 19 email message that was read, content type 2 might be a link to the last calendaring item that was browsed, content type 3 might be a link to the last web page that was browsed, etc.

One particularly useful implementation of the "Recent Items List" occurs in connection with the "back" navigation button drop down menu. Specifically, the navigation bar 408 (see FIGS. 5 and 6) includes a "back" navigation button in the form of a leftward-facing arrow. This navigation button includes a drop down menu that can be accessed by clicking on user-engagable indicia 411 located adjacent the button. The drop down menu might list the last three or four items that were most recently encountered by the user. Links to these items are managed in the navigation stack mentioned above. There may be times, however, when a user wishes to access a document on which they previously worked which is not listed in the back drop down menu. For example, consider the following: Assume that a user is browsing through various functionalities and visits an email message from a friend. The email message includes a link that the user follows. to a web page. Assume further that the web page includes a 12-page article that the User clicks through.

If a user wishes to return to their friend's email message, then they can click the "back" navigation button 12 times to navigate back through the 12 pages to get to the email message. Alternately, the user can click the "back" drop down menu to see the last three or four items that they browsed. Accordingly, the user would have to click this drop down menu multiple times.

In the described embodiment, the "back" drop down menu supports a "Recent Items List" which contains links to the most recently browsed items of the different content types if they do not appear in the back drop down menu. In the document-centric example above, the "Recent Items List" would contain links to the last mail message, last calendar item, last contact, and last document that the user visited, if those items do not appear in the back drop down menu.

Figure 14:
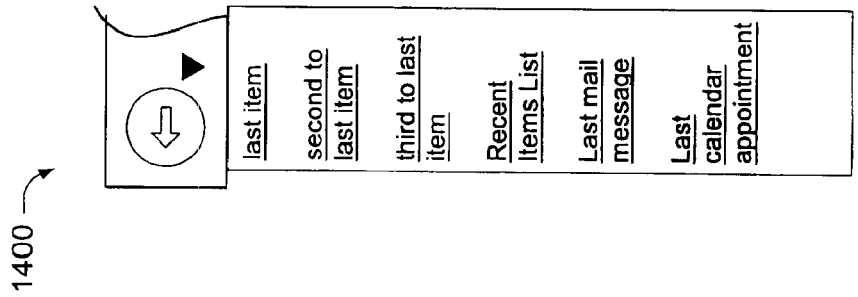
FIG. 14 is a diagram that illustrates an exemplary implementation of the "Recent Items List."

FIG. 14 shows an exemplary "back" drop down list 1400 that contains links to three most recently accessed items, as well as a "Recent Items List" that can be clicked on by a user. In the above example where the user has browsed a 12-page document, they would not see a link to their friend's email message in the navigation stack when they pulled down the drop down menu. They would, however, see a link to the email message in the "Recent Items List" because their friend's email message was the last email message type that was browsed or viewed by the user.

Conclusion

The methods and systems described above provide users with a much more user-centric computing experience that is tailored to particular users. The methods and systems provide this user-centric experience while conveniently enabling user participation without requiring the user to change their computing context. Multiple different functionalities can be provided that enable a user to accomplish multiple different tasks. Hence, while a user accomplishes a task associated with one functionality, they can view quick links associated with other functionalities without having to change their present computing context.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of providing information to a computer user comprising:

displaying, in a navigable window of a display area of a user interface, a first contextual display associated with a first context that can enable a user to accomplish one or more tasks, said displaying being accomplished using a single application program that is configured to provide multiple different contexts; and without changing the first context and using the single application program, presenting quick link to one or more contexts that are different from the user's current context and that are provided by the single application program, each context being associated with a functionality that can enable the user to accomplish various tasks that are different form the one or more task that the user can accomplish using the first contextual display, the quick links being selectable to navigate the navigable window to a context associated with a selectable quick link, wherein said displaying is accomplished by the single application program using a navigable window comprising a single window, the application program being configured to navigate the single window between different contexts responsive to the user selecting a quick link;

displaying user-engagable indicia, each of which being associated with one or more quick links, said indicia being configured for engagement by a user so that the user can view the associated one or more quick links.

2. The method of claim 1, wherein each functionality comprises a document-centric functionality.

3. The method of claim 1, wherein each of the functionalities is different.

4. The method of claim 1 further comprising prior to said presenting, automatically determining at least some of the quick links based, at least in part, on a user's behavior within the single application program.

5. The method of claim 1 further comprising prior to said presenting, automatically determining at least some of the quick links based, at least in part, on a user's history within the single application program.

6. The method of claim 1, wherein the single application program is configured with navigation instrumentalities that enable a user to navigate back and forth between the multiple different contexts.

7. The method of claim 6, wherein the single application program is configured with a navigation model to manage navigation activities of the user, the navigation model comprising a navigation stack.

8. The method of claim 1 further comprising:

presenting the user with a choice of multiple different algorithms, each algorithm being configured to provide a different collection of quick links; and said presenting of the quick links being performed responsive to a user selecting one of the multiple different algorithms.

9. The method of claim 8, wherein one of the multiple different algorithms comprises an algorithm that presents quick links on a favorites list based on items visited most often by a user in combination with items that have been recently added by a user to a favorites list.

10. The method of claim 8, wherein one of the multiple different algorithms comprises an algorithm that presents quick links based on items visited most often by a user in combination with items that have been recently visited by a user.

11. The method of claim 8, wherein one of the algorithms comprises an algorithm that presents multiple quick links each of which representing a different document type that was the last item of a particular document type that was visited by a user.

12. The method of claim 8, wherein some of the algorithms are employable across multiple different content types.

13. One or more computer-readable media having computer-readable instructions thereon which, when executed by a computer, cause the computer to:

provide multiple different functionalities within the confines of a single application program, the multiple different functionalities being associated with individual different document-centric tasks that can be accomplished by a user, individual document-centric tasks being associated with different document types and different contents;

define a single navigable window associated with a first content within which the different functionalities can be presented to a user so that they can accomplish a task associated with a particular functionality, the single navigable window being configured to navigate back and forth between the different functionalities;

define individual user-engagable indicia and associate those indicia with one or more of the multiple different functionalities, each indicia being engagable by a user to display quick links that are associated with a functionality, individual quick links being associated with a document that can enable a user to accomplish a task; each in a content separate from each other and display one or more of the quick links associated with one functionality and content while a user is engaged in a task associated with another of the functionalities and content without requiring the user to change the functionality or content within which they are working.

14. The computer-readable media of claim 13, wherein the instructions cause the computer to display a selection of multiple different algorithms from which a user can choose and which affect the quick links that are displayed.

15. The computer-readable media of claim 14, wherein one of the multiple different algorithms comprises an algorithm that presents quick links on a favorites list based on items visited most often by a user in combination with items that have been recently added by a user to a favorites list.

16. The computer-readable media of claim 14, wherein one of the multiple different algorithms comprises an algorithm that presents quick links based on items visited most often by a user in combination with items that have been recently visited by a user.

17. The computer-readable media of claim 14, wherein one of the algorithms comprises an algorithm that presents multiple quick links each of which representing a different document type that was the last item of a particular document type that was visited by a user.

18. The computer-readable media of claim 17, wherein said algorithm that presents multiple quick links is extendable to include newly created document types.

19. A method of providing information to a computer user comprising:

receiving information that pertains to multiple different user contacts within an application program;

presenting a display comprising a navigable window to a user, the display pertaining to a fit user contact within the application program, the first user context permitting the user to accomplish tasks pertaining to a first content type; and without changing the first context, and using the single application program, displaying multiple quick links that are associated with multiple contexts that are different from the first user context, the displayed quick links being associated with said information and being associated with a different content type, the quick links being selectable to navigate the navigable window to the different contexts, wherein each context is associated with a functionality that enables a user to accomplish various tasks that are different from the one or more tasks that the user can accomplish using the first contextual display;

displaying user-engagable indicia, each of which being associated with one or more quick links, said indicia being configured for engagement by a user so that the user can view the associated one or more quick links.

20. The method of claim 19, wherein the multiple different user contexts are each associated with a different content type.

21. The method of claim 19, wherein said displaying of said at least one quick link comprises displaying multiple quick links, at least some of the quick links being associated with context that are each associated with a different content type.

22. The method of claim 19, wherein said displaying comprises displaying the at least one quick link in a drop down menu.

23. The method of claim 19, wherein said displaying comprises doing so without changing content of the display that pertains to the first user context.

24. The method of claim 19, wherein said information comprises information that is generated by the user.

25. The method of claim 19, wherein said information comprises information that is not generated by the user.

26. The method of claim 19, wherein said information comprises information that can dynamically change.

27. The method of claim 19, wherein said receiving comprises receiving said information while the user is working within the first user context.

28. The method of claim 19, further comprising:

receiving user input that selects a displayed quick link; and presenting a display by navigating the navigable window to the user pertaining to a context that is associated with the selected quick link.

29. Software code embodied on a computer-readable medium which, when executed by a computer, provides a user interface (UI) comprising:

a single window that is capable of being navigated to and between multiple different functionalities in different contents that enable a user to accomplish multiple tasks in connection with a single application that provides the multiple different functionalities;

links associated with the different functionalities and configured to enable the user to navigate the single window to and between the multiple different functionalities; and user-engagable indicia associated with one or more of the links, the user-engagable indicia being engagable by a user to display quick links that are associated with a particular functionality, the quick links being engagable by the user to automatically navigate the single window to a functionality with which the quick link is associated, said software code being configured to enable a user to navigate backward and forward, in a browser-like fashion, between the different functionalities and contents, wherein the user interface comprises at least one command area that is configured to present context-sensitive commands that automatically change as the user's context changes when they navigate to and between the multiple different functionalities, said at least command area configured to display a context block that contains multiple algorithms from which a user can select to vary a list of quick links that are displayed for the user.

30. The software code of claim 29, wherein at least some of the algorithms are employable with different content types.

31. The software code of claim 29, wherein the UI further comprises browser-like navigation buttons that are engagable by the user for navigating to and between the multiple different functionalities.

32. A computer embodying the computer-readable medium of claim 29.

* * * * *